H. D. HARVEY.
DIRIGIBLE HEADLIGHT CONNECTION.
APPLICATION FILED NOV. 28, 1917.
1,267,218.
Patented May 21, 1918.
2 SHEETS—SHEET 1.
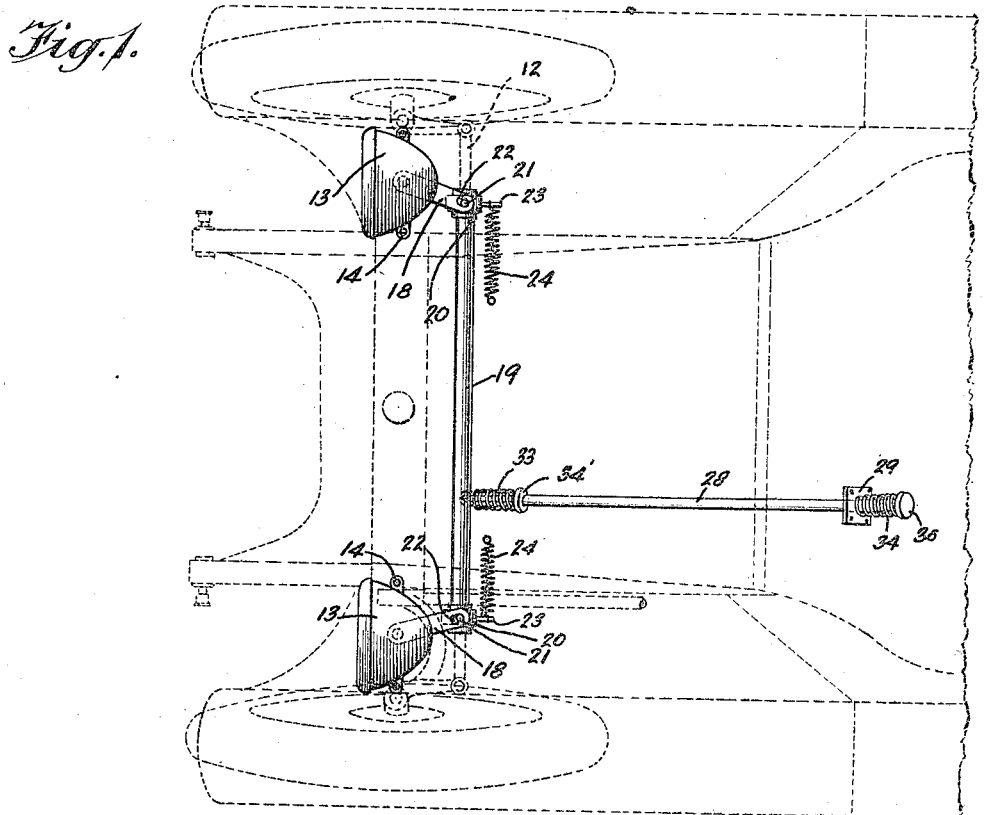
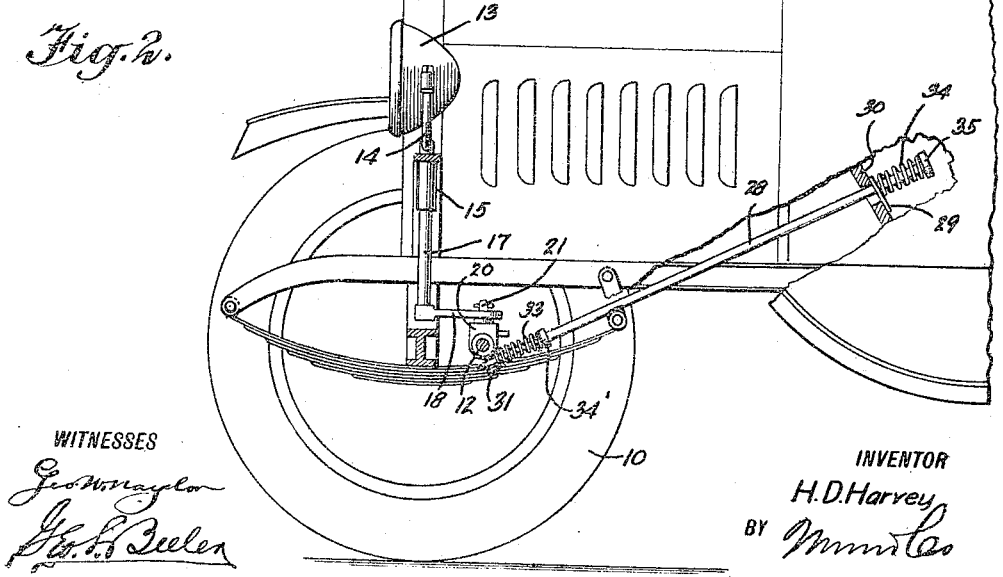
WITNESSES
INVENTOR
H. D. Harvey,
BY
ATTORNEYS

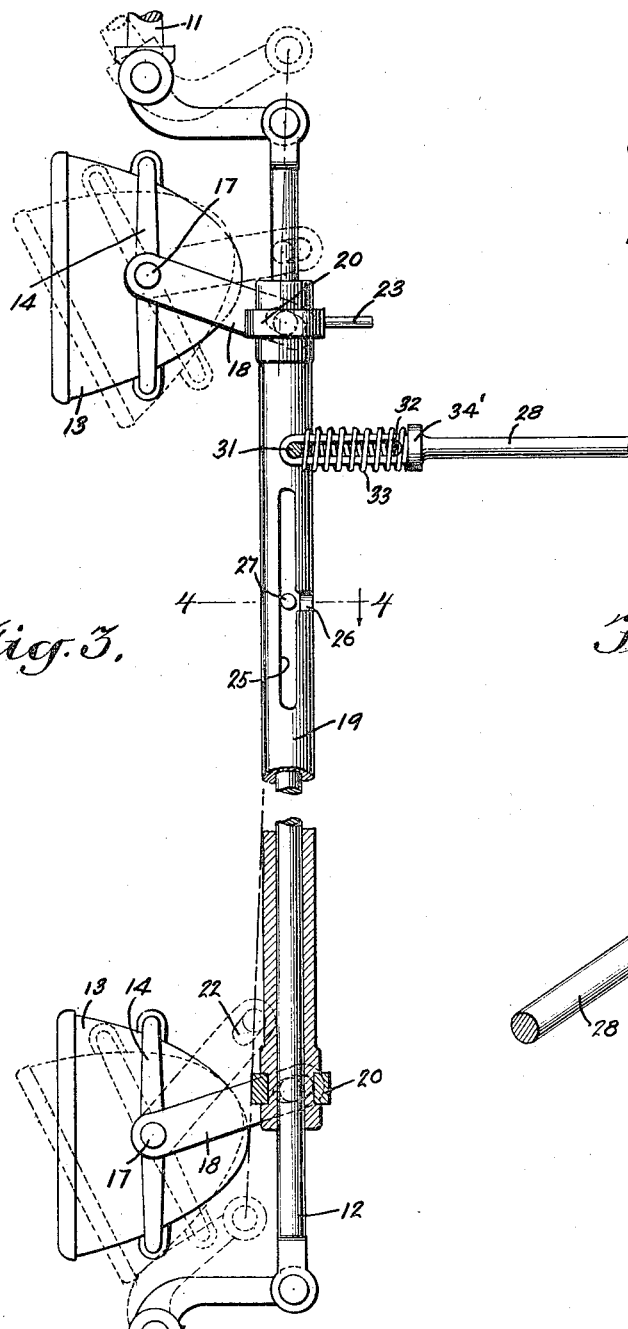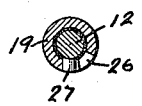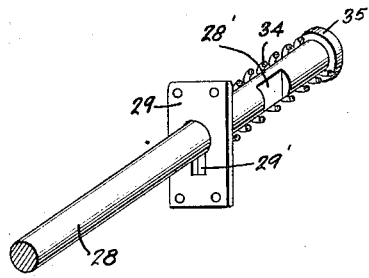

UNITED STATES PATENT OFFICE.

HENRY DUDLEY HARVEY, OF HILLSDALE, NEW YORK.

DIRIGIBLE HEADLIGHT CONNECTION.

1,267,218. Specification of Letters Patent. Patented May 21, 1918.

Application filed November 28, 1917. Serial No. 204,370.

*To all whom it may concern:*

Be it known that I, HENRY D. HARVEY, a citizen of the United States, and a resident of Hillsdale, in the county of Columbia and State of New York, have invented a new and Improved Dirigible Headlight Connection, of which the following is a full, clear, and exact description.

This invention relates to headlights and has particular reference to means for swinging such lights laterally coincidentally with the turning or steering of the vehicle laterally, if desired, for the purpose of illuminating the roadway ahead irrespective of whether the roadway is curved or straight. In the usual practice of headlights for automobiles or similar vehicles the headlights are held in stationary position and hence are not deflected or turned laterally to illuminate the roadway at a curve, and hence the driver of the vehicle is not able to get a proper view of the roadway at one of the most critical times.

Among the objects, therefore, of this invention is to provide a means whereby the headlights of an automobile are adapted to be so connected to the steering devices of the front wheels as to be steered or turned laterally automatically in connection with the steering of the vehicle, but with provision made so that the lamps or lights may be left stationary with respect to the body if desired.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a plan view of my improvement showing in dotted lines its relation to the vehicle.

Fig. 2 is a side elevation of the same, parts being broken away to better indicate the construction.

Fig. 3 is a bottom plan view of the improved connection, parts being in section.

Fig. 4 is a transverse sectional detail on the line 4—4 of Fig. 3; and

Fig. 5 is a perspective detail view of the rear end or foot portion of the controller rod.

Referring now more particularly to the drawings I show a conventional type of automobile whose front wheels 10 are mounted upon steering knuckles 11, and connected by a tie bar 12. Any suitable means may be provided to actuate the knuckles for steering purposes. I show two lamps 13 each mounted in a vertical fork 14 swiveled in a bracket 15 for rotation around a vertical axis adjacent to the front part of the body 16 as usual. To the lower end of the shank 17 of the lamp bracket is secured an arm 18 extending rearwardly, at any desired angle or distance above the tie bar.

19 indicates a tubular member shown in this instance as being mounted upon the tie bar and adapted for reciprocation in either direction with the tie bar or to be held stationary while the tie bar may reciprocate independently thereof within it. Upon each end of the member 19 is swiveled an annular collar 20 having an upwardly projecting pintle 21 having loose bearing in a slot 22 in the rear end of the arm 18. The collar 20, however, is adapted to be held from rotation irrespective of any rotation that may be imparted to the tube or sleeve 19. The arms 18 are, therefore, fixed to the ends of the sleeve 19 so as to always have a definite relation to each other and said sleeve. Each of the collars 20 may also be provided with a rearwardly projecting pin or lug 23 serving as a connection for a spring 24, or its equivalent, acting upon the device tending to hold the sleeve in normal mid position and the lamps with their focal axes directed forwardly parallel to the longer axis of the vehicle.

The sleeve 19 as indicated in Figs. 3 and 4 is formed with a double or T-shaped groove having a longitudinal portion 25 and a transverse or circumferential arc shaped portion 26. A lug 27 is fixed to the tie bar 12 and projects into said T-shaped slot. When the lug occupies the position of Fig. 3 with its center in the longer axis of the slot 25 the tie bar is free to reciprocate without moving the sleeve and the lamps. When, however, the sleeve is given a partial rotation by any suitable means so as to cause the lug 27 to enter the short transverse slot 26, endwise movement of the tie bar in either direction will cause a corresponding movement of the sleeve and a lateral swinging movement of the lamps as indicated in dotted lines in Fig. 3.

As a suitable and convenient means for controlling the position or rotation of the sleeve 19, and hence its positive engagement with or disconnection from the tie bar, I employ a controller rod having one end projecting through a plate 29 fixed to the floor or dashboard 30 of the vehicle while the forward end of the rod 28 has resilient connection with a pin 31 projecting downwardly from the sleeve. This connection is effected by providing a slot 32 in the end of the rod through which the pin 31 projects while a spring 33 surrounds the slotted portion of the rod and bears at its opposite ends against the pin 31 and a shoulder 34'. The normal tendency of this spring is to force the pin 31 resiliently forwardly tending to cause the rotation of the sleeve 19 and to bring the lug 27 into the slot 26. This tendency, however, of the spring 33 is normally resisted by another spring 34 located between the rear end or head 35 of the rod and said plate 29. In other words the spring 34 is calculated to hold the pin 31 rearwardly so that the lug 27 is always lying in the slot 25 in which position there is no positive connection between the rod 12 and sleeve 19 for reciprocation of one from the other.

The plate 29 is provided with a key hole slot 29' and the rear end portion of the rod is provided with a notch or notches 28' where it is surrounded by the spring 34 whereby when the driver of the car applies his foot to the head 35 and forces the rod 28 forwardly the spring 34 is put under compression and the notched portion 28' of the rod is slipped into the slot 29' where the rod will be held as long as desired. In this position of the rod the spring 33 acts to hold the sleeve 19 rotated so that the lug 27 is retained in the slot 26. Hence under these conditions the steering of the vehicle will cause the reciprocation of the sleeve 19 along with the tie bar, and hence the lamps will be steered or rotated laterally to an extent proportional to the angle of turning of the vehicle or any angle that may be predetermined as a suitable angle for this purpose. For ordinary purposes as for driving through city streets or well lighted roadways, or for daylight riding, obviously the operation of the steering is simplified by kicking the rear end of the controller rod loose so as to occupy the normal position indicated in Figs. 2 and 5.

While I show the arms 18 arranged at an oblique angle to the axes of the lamps it is obvious that they may be parallel, and furthermore by making these arms longer or shorter, with respect to the length of the steering knuckle arms, the extent of lateral deflection of the lights may be varied accordingly.

I claim:

1. The combination with an automobile, a pair of headlights supported thereon and steering devices including a tie bar extending adjacent to both of the headlights, of a rigid member extending along the tie bar and supported thereby, connections between the headlights and said rigid member, resilient means connected to said member and serving normally to hold the member and the headlights stationary with respect to the automobile, and means under the control of the operator to positively lock the member to the tie bar to cause lateral movement of the headlights coincidentally with the steering of the automobile.

2. The combination with an automobile, a pair of headlights supported thereon and steering devices including a tie bar extending adjacent to both of the headlights, of a sleeve mounted upon the tie bar, connections between the headlights and the sleeve, means acting upon the sleeve tending to hold the same and the headlights stationary with respect to the automobile, and means under the control of the operator to positively connect the sleeve to the tie bar to cause the lateral movement of the headlights coincidentally with the steering of the automobile.

HENRY DUDLEY HARVEY.

Copies of this patent may be obtained for five cents each, by addressing the "Commissioner of Patents, Washington, D. C."